May 12, 1942.  W. R. KOCH  2,282,971
SIGNAL DETECTING SYSTEM
Filed Nov. 30, 1939  2 Sheets-Sheet 2
Fig. 3.
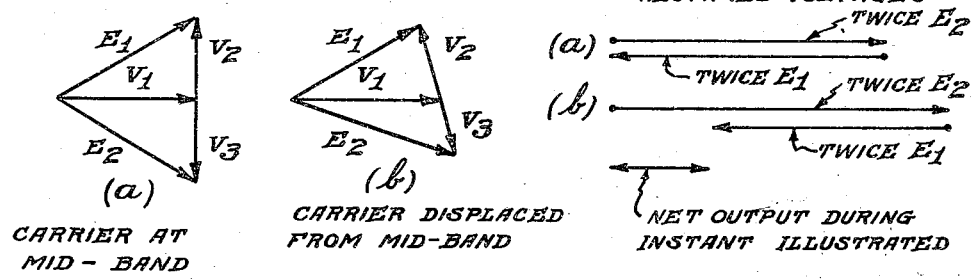
Fig. 4.
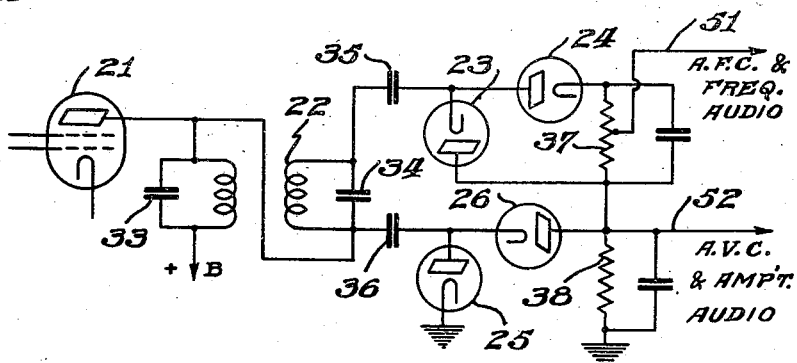
Fig. 5.
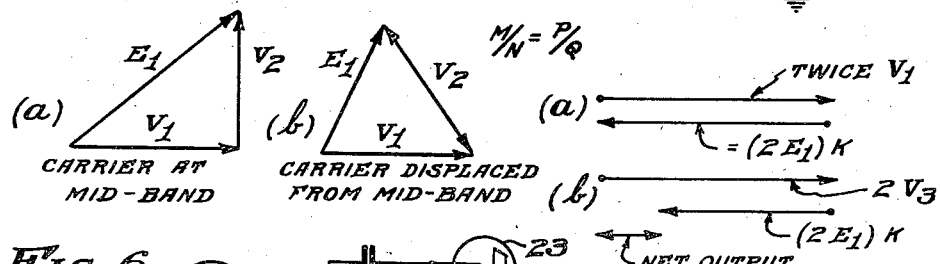
Fig. 6.
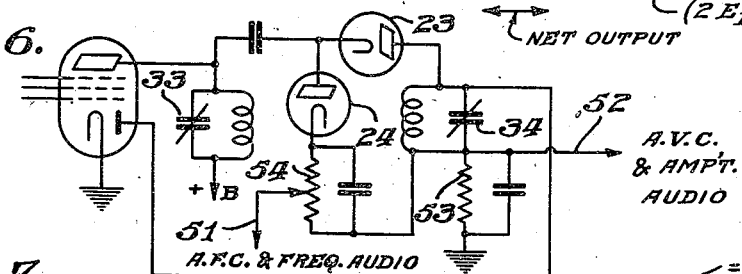
Fig. 7.
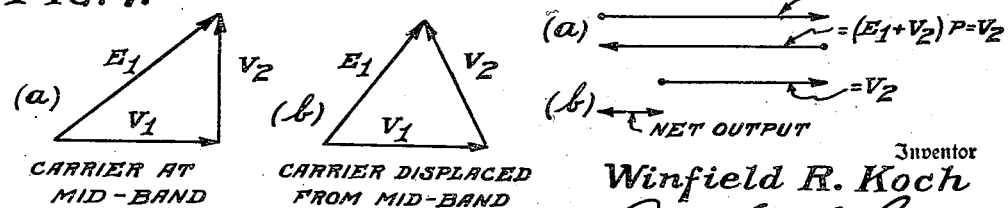
Inventor
Winfield R. Koch
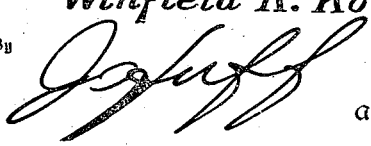
Attorney Patented May 12, 1942

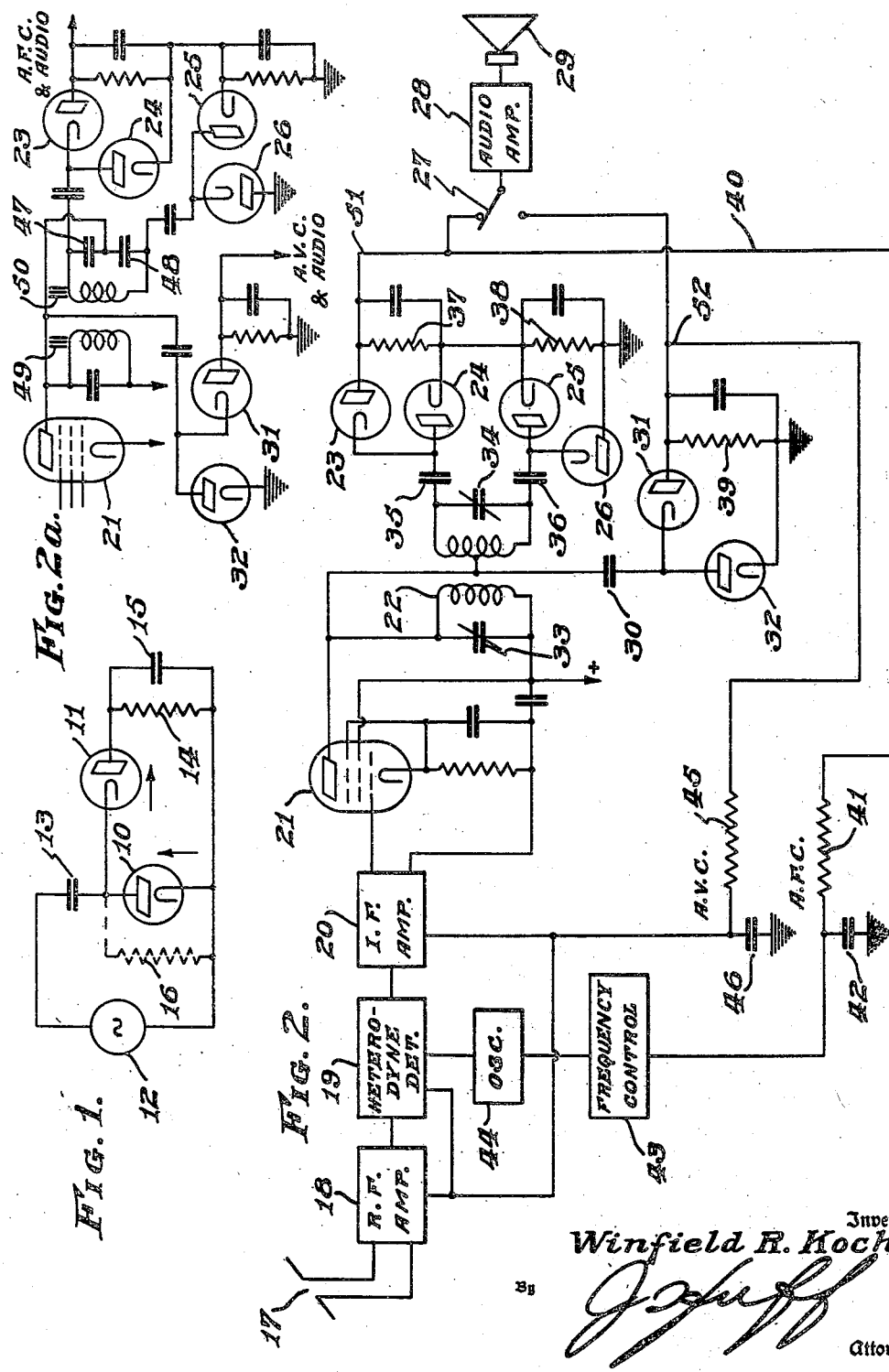

2,282,971

UNITED STATES PATENT OFFICE 2,282,971

SIGNAL DETECTING SYSTEM

Winfield R. Koch, Haddonfield, N. J., assignor to Radio Corporation of America, a corporation of Delaware Application November 30, 1939, Serial No. 306,940

5 Claims. (Cl. 250—20)

This invention relates to detecting systems such as are useful for alternatively detecting either amplitude or frequency modulated signals, and has for its principal object the provision of an improved system and method of operation which have the advantages inherent in the use of voltage doublers as the signal detectors.

Various types of systems adapted to detect either amplitude or frequency modulated signals have been provided in the past. These systems each include some one of the various types of networks for converting changes in frequency to corresponding changes in voltage. One such network involves the provision of a connection between the high voltage primary terminal and the mid-point secondary terminal of a coupling transformer. Due to the fact that change in the frequency of the primary voltage results in a phase shift of the secondary voltage with respect to the primary voltage, this connection makes available a resultant voltage of a magnitude which varies in accordance with change in the frequency of the primary voltage and therefore in accordance with the signal.

The present invention is illustrated as applied to this type of discriminating network. It differs from known circuits of this type in that the detecting elements are of the voltage doubler type. This modified circuit is advantageous in that it (1) avoids the necessity of a D. C. return between the detector output and input circuits, thus avoiding the use of the choke coil usually required in this type of circuit, (2) permits the use of center-tapped capacitors on the coupling transformer secondary, thus making feasible the use of an iron plug trimmer without producing the unbalance otherwise encountered when an iron core trimmer is used with a center-tapped coil, (3) doubles the output voltage, thus increasing the overall gain of the channel, and (4) renders available a contact potential which is twice that of the ordinary diode, thus preventing the drawing of grid current by a direct-connected audio amplifier at 100% modulation of the signal carrier.

The invention will be better understood from the following description considered in connection with the accompanying drawings, and its scope is indicated by the appended claims.

Referring to the drawings,

Figure 1 is an explanatory diagram relating to the operation of the improved detecting system, Figure 2 is a wiring diagram of a radio receiver including the invention, Figure 2a is a wiring diagram of a modification of the device of Fig. 2, Figure 3 designates a plurality of vector diagrams relating to the operation of the detecting system of Fig. 2, Figure 4 illustrates a modified detecting system wherein the use of a coupling transformer secondary mid-tap connection is avoided, Figure 5 designates a plurality of vector diagrams relating to the operation of the detector system of Fig. 4, Figure 6 is a wiring diagram of a further modification of the improved detecting system, and Figure 7 designates a plurality of vector diagrams relating to the operation of the system of Fig. 6.

Fig. 1 illustrates a voltage doubler detector circuit which includes a pair of diodes 10 and 11, coupled to a signal modulated carrier source 12 through a radio frequency coupling or audio-frequency blocking capacitor 13 and arranged to render the detected signal available at the terminals of an output resistor 14 and a radio frequency bypass capacitor 15. In this figure, the current flow for one half cycle is indicated by the horizontal arrow, and that for the next half cycle by the vertical arrow. As indicated by broken lines, a resistor 16 may be connected in shunt to the diode 10 if required to produce the desired time constant. The voltage available at the output resistor 14 is of course twice that available with the usual single diode circuit of this type.

The system of Fig. 2 includes an antenna 17, from which frequency modulated signals are supplied through a radio frequency amplifier 18, a heterodyne detector 19, intermediate frequency amplifiers 20 and 21, a coupling transformer 22, a voltage doubling detector circuit 23 to 26, a switch 27, and an audio amplifier 28 to a loudspeaker 29. Amplitude modulated signals are similarly supplied from the antenna 17 to the primary side of the transformer 22, and thence through the coupling or audio frequency blocking capacitor 30, the voltage doubling detector 31—32, the switch 27, and the audio amplifier 28 to the loudspeaker 29.

For tuning the primary and secondary circuits of the transformer 22, the adjustable capacitors 33 and 34 are provided. The secondary circuit is coupled to the voltage doubling detectors 23 to 26 through the audio frequency blocking capacitors 35 and 36, and each pair of diodes is provided with an output resistor which is shunted by a radio frequency bypass capacitor.

Connected to the high voltage side of the series-connected output resistors 37 and 38 of the diodes 23—24 and 25—26 is an automatic frequency control lead 40 which includes a resistor 41 and is connected to ground through a capacitor 42 for draining off the audio frequency component. Through this conductor 40, there is applied to the frequency control device 43 of the oscillator 44 a potential which varies with change in the mid-frequency of the received signal and functions to maintain the oscillator at a constant frequency difference from the mid-frequency of the frequency modulated signal or with the carrier of the amplitude modulated signal.

Automatic volume control potential derived from the high voltage terminal of the output resistor 39 of the voltage doubling detector 31—32 is applied through a resistor 45 to the input circuits of the devices 18, 19 and 20, a capacitor 46 being interposed between this lead and ground for draining off the audio frequency component of this potential.

The operation of the voltage doubling detector arrangement of Fig. 2 is indicated by the vector diagrams of Fig. 3, the first and third of which illustrate the relation existing when the carrier is at the mid-band frequency and the second and fourth of which illustrate the relation existing when the carrier is displaced from the mid-band. In the first and third vector diagrams, $V_1$ represents the primary voltage of the transformer 22, $V_2$ and $V_3$ each represent one-half of the secondary voltage of this transformer, $E_1$ represents the voltage impressed on the upper voltage doubler 23—24, and $E_2$ represents the voltage impressed on the lower voltage doubler 25—26. As indicated by the third vector diagram, these various potentials are balanced at the carrier or mid-band frequency by the voltage doubling detectors and no resultant potential is applied to the lead 40.

When the mid-frequency or carrier frequency, as the case may be, varies, however, these voltages are unbalanced, as indicated by the second vector diagram of Fig. 3, and the resultant voltage indicated by the lower vector of the fourth vector diagram is made available at the terminals of the voltage doubling detector output resistors 37 and 38. Since variation in volume or amplitude is closely regulated through the automatic volume control connection 40, this resultant voltage is proportional to the variation in the frequency of the applied voltage.

The modified system of Fig. 2a is similar to that of Fig. 2, with the exception that the capacitors 47 and 48 are arranged to afford a connection which permits of the iron core trimmer plugs 49 and 50 without unbalancing the output.

Fig. 4 illustrates a circuit connection whereby the use of a center-tapped secondary is avoided. In this connection, the terminals 51 and 52 correspond to the similarly numbered terminals of Fig. 2. The response of this current to frequency modulated signals will, of course, not be quite the same on each side of the mid-band, especially for highly modulated signals.

The relations existing with the connections of Fig. 4 are indicated by the four vector diagrams of Fig. 5, wherein $E_1$ represents the voltage applied to the voltage doubler rectifiers, $V_1$ representing the transformer primary voltage, $V_2$ representing the transformer secondary voltage, and K is a factor introduced by the intermediate tap connection of the output resistor 37. At the mid-band or carrier frequency (first diagram of Fig. 5), the rectified voltages are balanced as indicated by the third diagram of Fig. 5, and the net output of the detector is zero. When the frequency varies, however, a resultant voltage proportional to frequency is produced, as indicated by the fourth vector diagram of Fig. 5.

The modification of Fig. 6 involves the use of a modified voltage doubler detector which requires fewer parts than the preceding modifications and affords full transformer selectivity for amplitude modulated signals. In this connection, the amplitude modulated signal is derived from the high potential terminal 52 of the output resistor 53, and the frequency modulated signal is derived from the intermediate terminal 51 of the resistor 54. Thus the frequency modulation diodes 23—24 function to add the primary voltage to the vector sum voltage of the primary and secondary voltages, as indicated by the vector diagrams of Fig. 7, and part of this composite voltage is balanced against the secondary voltage. These voltages are balanced at the carrier or mid-frequency and at other frequencies provide a resultant voltage suitable for automatic frequency control or for frequency modulated signal output.

It is apparent that some capacity coupling exists between the transformer primary and secondary windings in the circuit of Fig. 4, and that this must be considered in the design of the transformer.

I claim as my invention:

1. The combination of a transformer provided with primary and secondary circuits, an output impedance device, a pair of diodes provided with a cathode and an anode connected together and having a common input connection and with a cathode and anode interconnected through said device, and means for applying to said common connection a voltage which is the resultant of the voltages of said primary and secondary circuits.

2. The combination of a transformer provided with primary and secondary circuits, an output impedance device, a pair of diodes provided with a cathode and an anode connected together and having a common input connection and with a cathode and anode interconnected through said device, and means including an audio frequency blocking capacitor for applying to said common connection a voltage which is the resultant of the voltages of said primary and secondary circuits.

3. The combination of a transformer provided with primary and secondary circuits, an output impedance device, a pair of diodes provided with a cathode and an anode connected together and having a common input connection and with a cathode and anode interconnected through said device, means including an audio frequency blocking capacitor for applying to said common connection a voltage which is the resultant of the voltages of said primary and secondary circuits, and a radio frequency bypass capacitor connected in shunt to said device.

4. The combination of a transformer provided with primary and secondary circuits, an output impedance device, a pair of diodes provided with a cathode and an anode connected together and having a common input connection and with a cathode and anode interconnected through said device, and means including a pair of capacitors connected in shunt to said secondary circuit for applying to said common connection a voltage which is the resultant of the voltages of said primary and secondary circuits.

5. The combination of a transformer provided with primary and secondary circuits, an output impedance device, a pair of diodes provided with a cathode and an anode connected together and having a common input connection and with a cathode and anode interconnected through said device, means for applying to said common connection a voltage which is the resultant of the voltages of said primary and secondary voltages, and means for deriving from said device a potential which varies as the frequency of the voltage applied to said primary circuit.

WINFIELD R. KOCH.